June 30, 1959  D. C. PORTER  2,892,326
RESILIENT CONNECTOR
Filed Jan. 20, 1958

INVENTOR.
DONALD C. PORTER
BY
Attorney

# United States Patent Office 2,892,326
Patented June 30, 1959

2,892,326
RESILIENT CONNECTOR

Donald C. Porter, Arcadia, Calif., assignor to Warren E. Swarthout, Arcadia, Calif.

Application January 20, 1958, Serial No. 709,946

6 Claims. (Cl. 64—7)

This invention relates to motion transmitting devices and particularly to a resilient connector which functions as a universal joint mechanism.

Ball and socket universal joints are well known for transmitting power from one element to another. In a copending Swarthout application, Ser. No. 620,711, filed November 6, 1956, now abandoned, a power-driven hand-operated sander or buffer is disclosed and claimed, this device using a certain type of ball and socket universal joint.

In my copending application, Ser. No. 672,029, filed July 15, 1957, now patent No. 2,854,829, an improved ball and socket universal joint for a hand power tool is described and claimed. The present invention is particularly suitable for this type of hand-operated power unit, as it provides desirable uniform rigidity, flexibility, and alignment control. The present invention is also economical to manufacture and has other advantages over prior flexible connections, as will be pointed out hereinafter.

This connector is made in the form of a tapered bellows of resilient material such as natural rubber, synthetic rubber or certain plastics. The bellows portion is molded integrally with a disc which supports sandpaper, buffing cloth or other cutting and polishing elements. The unit may be quickly assembled, uses a ball to provide the desired pressure transmission and alignment and uses the corrugations of the bellows for obtaining the flexibility required and the required torque transmission at all angles. The shaft for the power unit chuck is integral with the bellows supporting flange and with a ball, while an insert of nylon or similar material provides a ball seat and the cylinder for a screw holding the cutting material on the surface of the disc.

The principal object of the invention, therefore, is to facilitate the transmission of rotary power between two elements whose axes are adapted to vary in angular relationship.

Another object of the invention is to provide an improved flexible connector between two elements whose axes are adapted to vary in angular relationship.

A further object of the invention is to provide an improved flexible connector as a universal joint between a hand-operated power unit and a rotatable work load with controlled axial alignment.

A better understanding of this invention may be had from the following detailed description when read in connection with the accompanying drawings, in which.

Figure 1:
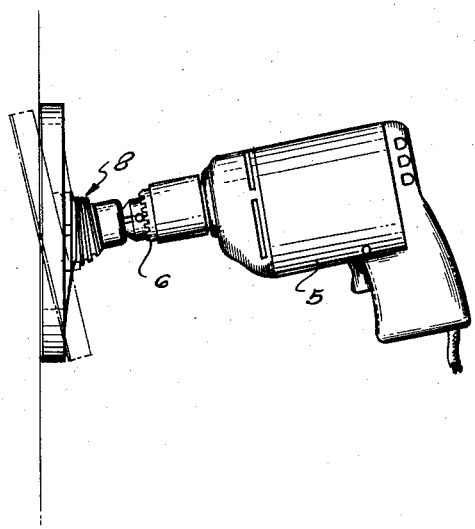
Fig. 1 is a side view of the invention incorporated in a hand-operated power sander.
Figure 2:
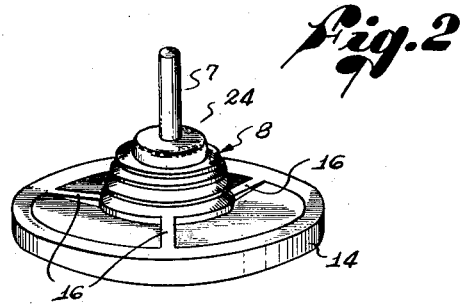
Fig. 2 is a perspective view of the flexible connector shown in Fig. 1.
Figure 3:
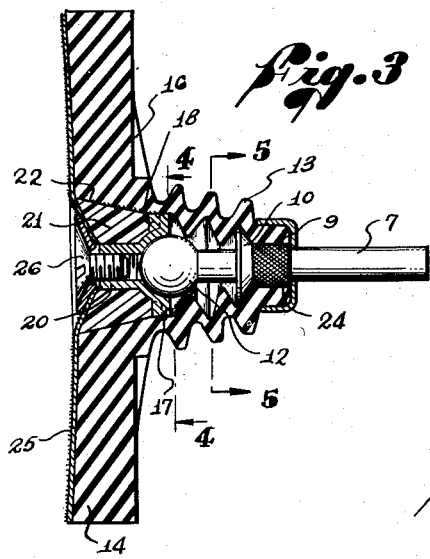
Fig. 3 is a cross-sectional view of the flexible connector.
Figure 4:
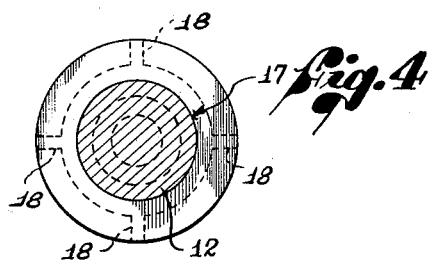
Fig. 4 is a detailed cross-sectional view taken along the line 4—4 of Fig. 3.
Figure 5:
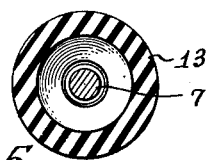
Fig. 5 is a detailed cross-sectional view taken along the line 5—5 of Fig. 3.

Referring, now, to the drawings in which the same reference numerals identify the same elements, a hand-controlled motor 5 has its chuck 6 connected to a shaft 7 of a flexible connector shown generally at 8. The shaft of the flexible connector has an enlarged diameter portion 9, a bevelled flange 10, and a ball 12.

The tapered flange 10 is mounted in the smallest internal corrugation of a bellows 13 having three external corrugations gradually increasing in diameter and then terminating in a disc 14. Although three corrugations have been shown, a smaller or larger number may be used depending on the size of the unit. As mentioned above, the bellows and disc unit may be made from resilient material, such as natural rubber, synthetic rubber, or certain plastics, it being noted that the face of the disc 14 is dished along a parabolic curve to provide constant and uniform pressure over its entire surface. The disc also has reinforcing ribs 16.

Bearing against the ball 12 is a socket unit 17 which is provided with four ribs 18 and a cylindrical portion 20 which is internally threaded. This unit may be made of nylon, Teflon, or similar material which provides a low coefficient of friction between the cup and the ball. Molded around the unit 17 is a resilient collar 21 which is cemented or vulcanized at 22 to the disc 14. The ribs 18 prevent slippage between the collar 21 and the socket unit 17. The upper end of the bellows is held in position around the larger diameter section 9 of the shaft 7 by a cup flange 24, which is press-fitted over the shaft 7 against the shoulder of the section 9, the section 9 being knurled to obtain a mechanical bond between the bellows 13 and the shaft 7.

As mentioned above, this unit is economical to manufacture since the bellows and disc may be molded in one piece, after which the shaft 7 is pressed upwardly until the flange collar 10 fits in the smallest internal corrugation. The cup flange 24 is then pressed over the shaft 7 to hold the upper end of the bellows in position. The last operation is to insert the assembly of socket unit 17 and collar 21 into the center of the disc and against the ball 12, the bellows being extended and maintained extended by attaching collar 21 to the disc 14. This completes the unit. Sandpaper, such as shown at 25, or other cutting or buffing material, may be attached by the screw 26 threaded into the cylindrical portion of the socket unit 17.

I claim:

1. A resilient connector comprising a member having a tapered bellows portion and a disc portion, said portions being integral, a ball shaft extending into said bellows portion and attached to the small end of said bellows portion, a socket element mounted in the center of said disc portion and abutting the ball portion of said ball shaft, a flange on said shaft positioned in an internal corrugation of said bellows portion.

2. A resilient connector comprising a member having a tapered bellows portion and a disc portion, said portions being integral, a ball shaft extending into said bellows portion and attached to the small end of said bellows portion, and a socket element mounted in the center of said disc portion and abutting the ball portion of said ball shaft, said socket element having an internally threaded cylindrical portion adapted to have a screw threaded therein.

3. A resilient connector between a rotatable power unit and a work disc comprising a drive element having a ball at one end and a shaft at the other end connected to said power unit, said element having a flange between said ball and the end of said shaft, a resilient bellows having an integral disc at one end thereof and having the other end thereof attached to said shaft, said flange being positioned in a corrugation of said bellows, and a socket in the center of said disc and in contact with said ball.

4. A resilient connector in accordance with claim 3 in which said bellows is tapered, said bellows having a large end and a small end, the small end thereof being attached to said shaft.

5. A resilient connector in accordance with claim 4 in which said socket has an internally threaded cylindrical portion adapted to have a screw threaded therein.

6. A resilient connector for rotating a disc at different angular relationships to a drive shaft comprising a tapered bellows having a work disc at one end thereof integral with said bellows, a drive shaft having a ball at one end, the other end of said shaft being connectable to a power unit, a socket for said ball at the center of said disc, said shaft passing through the small end of said bellows, and means for attaching the small end of said bellows to said shaft, said last-mentioned means being a flange within an internal corrugation of said bellows and a cup collar surrounding the upper end of said bellows.

References Cited in the file of this patent

UNITED STATES PATENTS

| | | |
|---|---|---|
| 2,012,012 | Kitzman | Aug. 20, 1935 |
| 2,537,847 | Neher | Jan. 9, 1951 |
| 2,569,593 | Whitney | Oct. 2, 1951 |
| 2,672,740 | Dunn | Mar. 23, 1954 |
| 2,775,879 | Doak | Jan. 1, 1957 |